United States Patent
Jeong et al.

(10) Patent No.: US 11,610,373 B2
(45) Date of Patent: Mar. 21, 2023

(54) METHOD OF GENERATING THREE-DIMENSIONAL MODEL DATA OF OBJECT

(71) Applicant: NAVER LABS CORPORATION, Seongnam-si (KR)

(72) Inventors: Yeong Ho Jeong, Seongnam-si (KR); Dong Cheol Hur, Seongnam-si (KR); Sang Wook Kim, Seongnam-si (KR)

(73) Assignee: NAVER LABS CORPORATION, Seongnam-si (KR)

( * ) Notice: Subject to any disclaimer, the term of this patent is extended or adjusted under 35 U.S.C. 154(b) by 0 days.

(21) Appl. No.: 17/095,068

(22) Filed: Nov. 11, 2020

(65) Prior Publication Data

US 2021/0142579 A1    May 13, 2021

(30) Foreign Application Priority Data

Nov. 12, 2019    (KR) .......................... 10-2019-0144539

(51) Int. Cl.
*G06T 19/00* (2011.01)
*G06T 7/73* (2017.01)
*G06T 7/246* (2017.01)

(52) U.S. Cl.
CPC ............ *G06T 19/006* (2013.01); *G06T 7/251* (2017.01); *G06T 7/75* (2017.01); *G06T 2207/30204* (2013.01); *G06T 2207/30244* (2013.01)

(58) Field of Classification Search
CPC .... G06T 7/73; G06T 7/74; G06T 7/75; G06T 7/251; G06T 15/10; G06T 17/00; G06T 17/20; G06T 19/006; G06T 2207/10016; G06T 2207/30204; G06T 2207/30244; G06T 2207/30208
See application file for complete search history.

(56) References Cited

U.S. PATENT DOCUMENTS

| | | | |
|---|---|---|---|
| 9,429,418 B2 | 8/2016 | Mitarai et al. | |
| 10,015,473 B2 | 7/2018 | Ito | |
| 10,102,647 B2 | 10/2018 | Yamaguchi et al. | |
| 10,748,581 B2 | 8/2020 | Bose et al. | |
| 2012/0321173 A1* | 12/2012 | Mitarai ..................... G06T 7/73 |
| | | | 382/154 |

(Continued)

FOREIGN PATENT DOCUMENTS

| | | | |
|---|---|---|---|
| JP | 2011198349 A | 10/2011 |
| JP | 2012022667 A | 2/2012 |

(Continued)

OTHER PUBLICATIONS

Gao, Qing Hong, et al. "A stable and accurate marker-less augmented reality registration method." 2017 International Conference on Cyberworlds (CW). IEEE, 2017. (Year: 2017).*

(Continued)

*Primary Examiner* — Diane M Wills
(74) *Attorney, Agent, or Firm* — Greer Burns & Crain, Ltd.

(57) ABSTRACT

The method of generating three-dimensional model data of an object includes estimating pose data of the object based on the first view data of the camera and first relative pose data of the object, and estimating second relative pose data of the object based on the pose data of the object and the second view data of the camera.

12 Claims, 8 Drawing Sheets

(56) References Cited

U.S. PATENT DOCUMENTS

2016/0371829 A1\* 12/2016 Yamaguchi ............... G06T 7/70
2017/0168559 A1\* 6/2017 Jayadevaprakash .........................
G06T 19/006

FOREIGN PATENT DOCUMENTS

JP 2017011328 A 1/2017
JP 2018523868 A 8/2018

OTHER PUBLICATIONS

Mur-Artal '15, Raul, Jose Maria Martinez Montiel, and Juan D. Tardos. "ORB-SLAM: a versatile and accurate monocular SLAM system." IEEE transactions on robotics 31.5 (2015): 1147-1163. (Year: 2015).\*

Mur-Artal, Raúl, and Juan D. Tardós. "Visual-inertial monocular SLAM with map reuse." IEEE Robotics and Automation Letters 2.2 (2017): 796-803. (Year: 2017).\*

Rad, Mahdi, and Vincent Lepetit. "Bb8: A scalable, accurate, robust to partial occlusion method for predicting the 3d poses of challenging objects without using depth." Proceedings of the IEEE International Conference on Computer Vision. 2017. (Year: 2017).\*

Kam, Ho Chuen, Ying Kin Yu, and Kin Hong Wong. "An improvement on ArUco marker for pose tracking using Kalman filter." 2018 19th IEEE/ACIS International Conference on Software Engineering, Artificial Intelligence, Networking and Parallel/Distributed Computing (SNPD). IEEE (Year: 2018).\*

Communication issued in corresponding Korean application No. 10-2019-0144539, dated Sep. 29, 2020.

\* cited by examiner

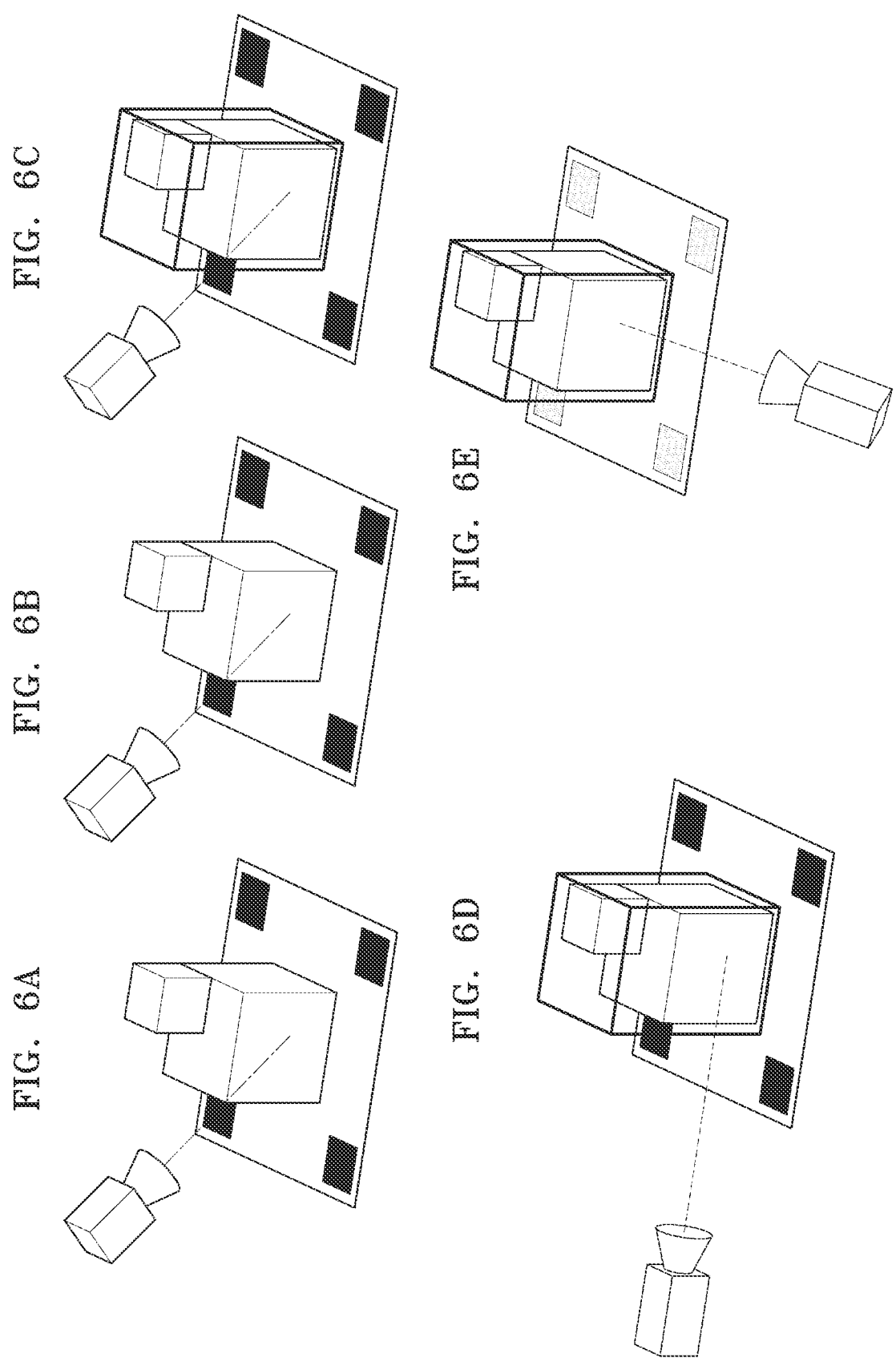

METHOD OF GENERATING THREE-DIMENSIONAL MODEL DATA OF OBJECT

CROSS-REFERENCE TO RELATED APPLICATION

This application is based on and claims priority under 35 U.S.C. § 119 to Korean Patent Application No. 10-2019-0144539, filed on Nov. 12, 2019, in the Korean Intellectual Property Office, the disclosure of which is incorporated by reference herein in its entirety.

BACKGROUND

1. Field

The present disclosure relates to a method of generating model data of an object. More particularly, the present disclosure relates to a method of generating model data of an object necessary to augment a three-dimensional object.

2. Description of Related Art

This section provides background information related to the present disclosure which is not necessarily prior art.

With the advancement of augmented reality (AR) technology, research has been conducted on a technology to accurately recognize an object and augment a three-dimensional virtual object on the object. In particular, three-dimensional model data is required to augment and display a three-dimensional virtual object on an object displayed on a display, and thus, a technology for sufficiently securing three-dimensional model data of an object is demanded. Thus, a technology for obtaining three-dimensional model data of an object by using marker information, such as ArUco marker technology, has been developed, but three-dimensional model data is unable to be generated in a situation where marker information is unable to be recognized.

SUMMARY

This section provides a general summary of the inventive concept, and is not a comprehensive disclosure of its full scope or all features of the inventive concept.

One or more embodiments of the present disclosure provide a method of generating three-dimensional model data of an object, in which the three-dimensional model data of the object may be generated even when marker information is unable to be recognized.

Additional aspects will be set forth in part in the description which follows and, in part, will be apparent from the description, or may be learned by practice of the presented embodiments of the disclosure.

According to an embodiment of the present disclosure, there is provided a method, performed by a computing device, of generating three-dimensional model data of an object. The method includes generating a first image by photographing an object positioned on a board including a marker with a camera at a first time point, and storing first view data of the camera at this time, generating first relative pose data of the object based on the marker included in the first image, estimating pose data of the object based on the first view data of the camera and first relative pose data of the object, generating a second image by photographing the object with the camera at a second time point, and generating second view data of the camera at this time, and estimating second relative pose data of the object based on the pose data of the object and the second view data of the camera.

According to another embodiment of the present disclosure, there is provided a computer program combined with an electronic device implemented as a computer and stored in a computer-readable recording medium in order to execute a method of generating three-dimensional model data of an object, according to an embodiment of the present disclosure.

Other aspects, features, and advantages other than those described above will become apparent from the following drawings, claims, and detailed description of the disclosure.

These general and specific embodiments may be implemented by using a system, a method, a computer program, or a combination thereof.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a diagram for explaining a method of generating a virtual block, according to an embodiment;

Figure 1:
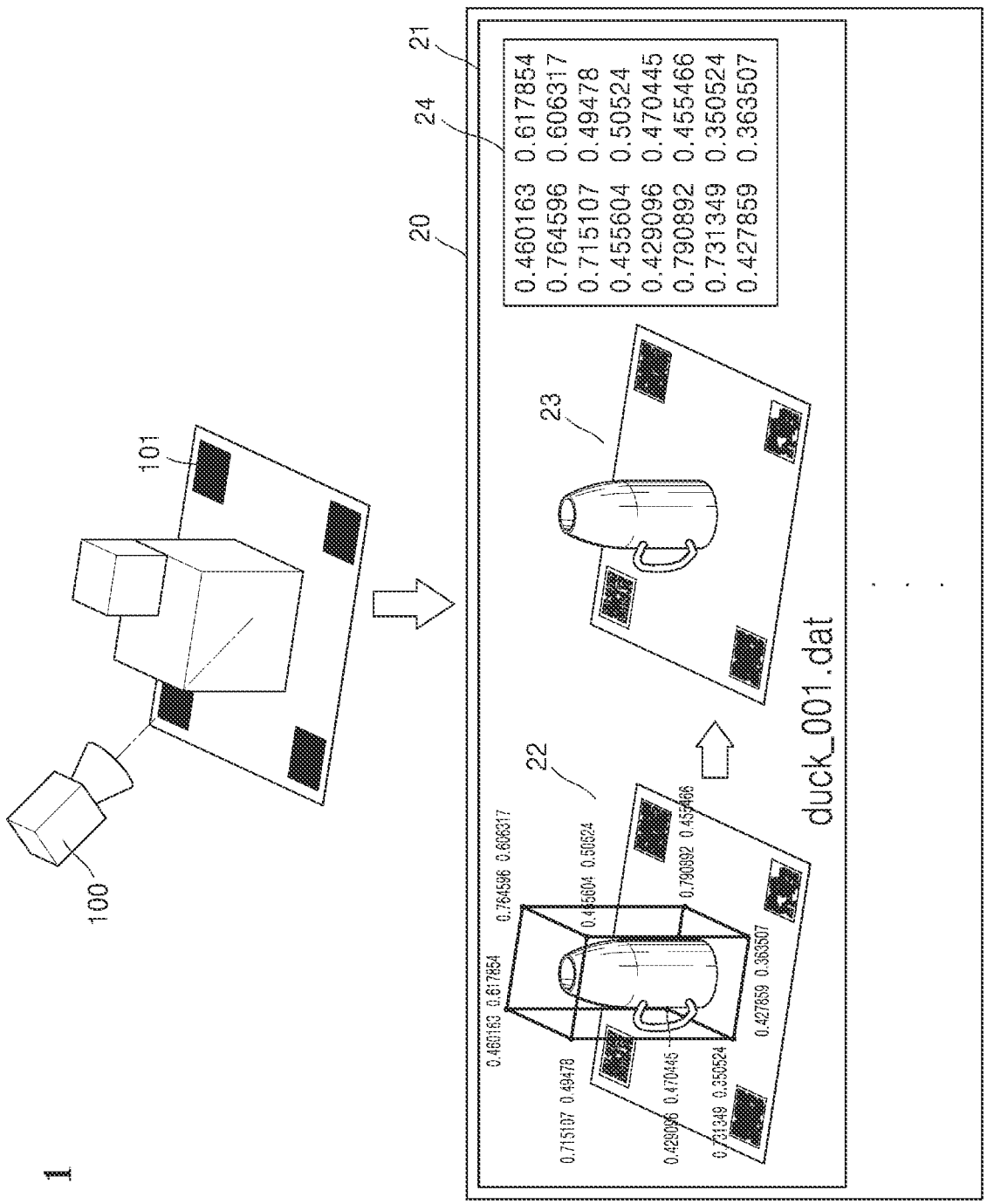
FIG. 1 is a diagram illustrating an example of an object pose estimation system performing a method of generating three-dimensional model data of an object, according to an embodiment.

It should be noted that these figures are intended to illustrate the general characteristics of methods and/or structures utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by the example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those of ordinary skill in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element, there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flowcharts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, a central processing unit (CPU), a controller, an arithmetic logic unit (ALU), a digital signal processor, a microcomputer, a field programmable gate array (FPGA), a system-on-chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, a central processing unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording media, including tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such a separate computer readable storage medium may include a universal serial bus (USB) flash drive, a memory stick, a Blu-ray/DVD/CD-ROM drive, a memory card, and/or other similar computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other similar medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one of ordinary skill in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different to that of the methods described, and/or components such as the described system, architecture, devices, circuit, and the like, may be connected or combined to be different from the above-described methods, or results may be appropriately achieved by other components or equivalents.

The following description refers to the accompanying drawings, which illustrate certain embodiments in which the present disclosure may be practiced. These embodiments are described in sufficient detail to enable a person of skill in the art to practice the present disclosure. It is to be understood that the various embodiments of the present disclosure are different from each other, but need not be mutually exclusive. For example, certain shapes, structures, and characteristics described herein may be changed from one embodiment to another and implemented without departing from the spirit and scope of the present disclosure. In addition, it should be understood that the positions or arrangements of individual elements in each embodiment may be changed without departing from the spirit and scope of the present disclosure. Thus, the following detailed description is not made in a limiting sense, and the scope of the present disclosure should be taken as encompassing the scope of the claims and all scopes equivalent thereto. Like reference numerals in the drawings indicate the same or similar elements over several aspects.

Hereinafter, various embodiments of the present disclosure will be described in detail with reference to the accompanying drawings so that those of ordinary skill in the art may easily implement the present disclosure.

Hereinafter, an object pose estimation system performing a method of generating three-dimensional model data of an object, according to an embodiment of the present disclosure, will be described in detail with reference to FIG. 1.

In an embodiment, three-dimensional model data 20 of an object may be obtained using a camera 100 capturing an image of the object and at least one marker 101. The three-dimensional model data 20 of the object may be transmitted to a three-dimensional augmented reality display system (not shown). In an embodiment, the three-dimensional augmented reality display system is a device for augmenting a three-dimensional virtual object on an object in augmented reality. The three-dimensional augmented reality display system may include, for example, a computing device and a server. The computing device may capture an image of an object and access the server to obtain relative pose data of the object displayed in the captured image. The server may collect the three-dimensional model data 20 from the object pose estimation system and may train a learning model implemented with an artificial neural network by using the three-dimensional model data 20. The server may receive a captured image from a three-dimensional object augmentation device, extract a position and relative pose of the object in the captured image by using the trained learning model, and transmit the extracted position and relative pose of the object to the computing device. The artificial neural network or learning model required in this process may be trained using three-dimensional model data of an object obtained according to an embodiment of the present disclosure.

The three-dimensional augmented reality display system may estimate relative pose data of the object displayed in the captured image and may render an image of a three-dimensional virtual object having the same relative pose data to augment and display the rendered image on the object in the captured image. That is, in order for the three-dimensional augmented reality display system to accurately recognize the object in the captured image and accurately augment the three-dimensional virtual object having the same pose as the object, a sufficient amount of three-dimensional model data obtained according to an embodiment of the present disclosure may be used as training data for the artificial neural network. In addition, according to an embodiment, the three-dimensional model data may be used to generate the image of the three-dimensional virtual object that is rendered.

Figure 2:
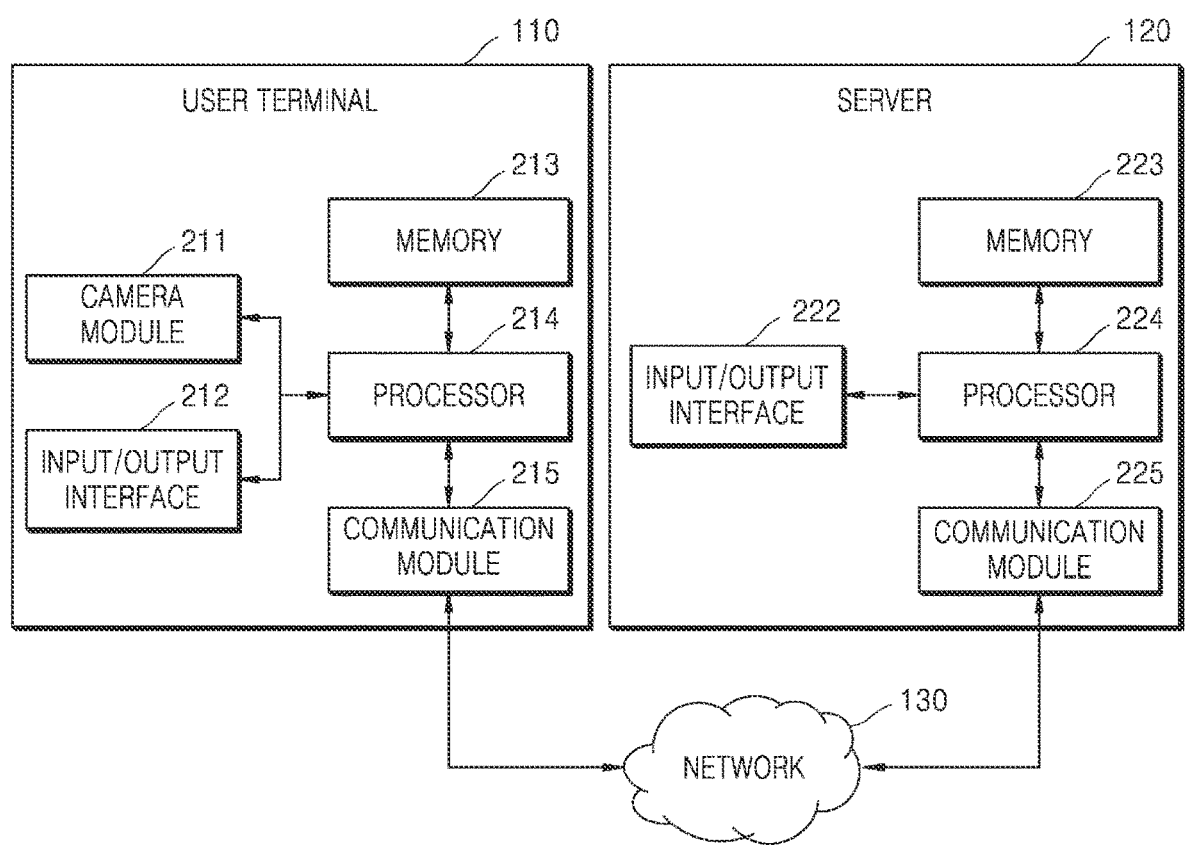
FIG. 2 is a block diagram for explaining internal configurations of a user terminal and server generating three-dimensional model data of an object, according to an embodiment.

In an embodiment, the camera 100 may be a user terminal including a camera module shown in FIG. 2, or may be a separately provided camera device. In addition, in an embodiment, the three-dimensional model data 20 of the object may be generated by a computing device in which a camera module is embedded, or may be generated by a separate computing device that has received an image of the object captured by the camera 100. Hereinafter, in FIG. 2, a user terminal with a camera module embedded therein is described as an example of the camera 100, but the camera 100 capturing an image of an object according to some embodiments is not always limited to a camera module embedded in a user terminal.

In an embodiment, the camera 100 may generate a captured image by photographing an object located in a space where the marker 101 is displayed. In this case, the object may be arranged in a preset direction at a preset position with respect to the marker 101.

By using information on the marker 101 displayed in a space where the object is located, relative pose data of the object may be obtained. Pose is a concept including a position and orientation of an object. A pose of the object may be understood as expressing a position and orientation of the object on a world coordinate system, and a relative pose of the object may be understood as expressing the position and orientation of the object on a camera coordinate system. In addition, a pose of the camera may be understood as expressing a position and orientation of the camera on the world coordinate system.

The marker 101 may be in the form of various recognition codes such as a one-dimensional barcode or a two-dimensional quick response (QR) code. However, it is noted that a marker according to some embodiments is not limited thereto, and may include all indicators of various types including information related to a position of an object.

In a method of generating three-dimensional model data of an object according to some embodiments, three-dimensional model data of an object may be generated for every frame by using the marker 101 and view data of the camera 100. According to another embodiment, the three-dimensional model data of the object may be generated by using the marker 101 and the view data of the camera 100.

In an embodiment, the view data of the camera 100 may be obtained using vision technology. In addition, the view data of the camera 100 is data directly related to a pose of the camera 100. The view data of the camera 100 may be a view matrix showing how the world, that is, a fixed subject, moved and rotated on the camera coordinate system defined by the pose of the camera 100. In other words, the view data of the camera 100 may refer to a matrix for converting a coordinate value on the world coordinate system onto the camera coordinate system, or element values thereof. A pose of the camera and the camera coordinate system defined thereby change according to a motion of the camera. The view data of the camera changes according to the motion of the camera. The method of generating three-dimensional model data of the object will be described below in more detail with respect to the related drawings.

A format of three-dimensional model data of an object generated according to an embodiment of the present disclosure will now be described in detail. Three-dimensional model data 20 of one or more objects generated in an embodiment may be generated for all frames captured by the camera 100. Thus, the three-dimensional model data 20 of the plurality of objects generated in an embodiment may be three-dimensional model data of the objects obtained based on different frames.

For example, three-dimensional model data 22 of the object generated in a certain frame may include an image 23 of the object corresponding to that frame and coordinates 24 of a virtual block corresponding to relative pose data of the object.

The virtual block according to an embodiment may be generated in an area corresponding to a region of interest (ROI) of the object. In an embodiment, a device for generating three-dimensional model data of an object may receive size information of the aforementioned virtual block and generate coordinates of the virtual block on an object coordinate system based on the received size information of the virtual block. The object coordinate system is a coordinate system defined by the marker 101, and the origin and each axis of the object coordinate system are determined by the marker 101. A user may determine a direction of the object based on the x, y, and z-axes of the object coordinate system and may make the object face the previously determined direction while placing the object at the origin of the object coordinate system.

Thereafter, the device for generating the three-dimensional model data may generate coordinates of the virtual block on the camera coordinate system based on the coordinates of the virtual block on the object coordinate system and the relative pose data of the object. In addition, the device for generating the three-dimensional model data may generate coordinates of the virtual block on a two-dimensional camera coordinate system as relative pose information of the object.

In an embodiment, the relative pose information of the object may include information on feature points of the virtual block. In this case, the virtual block may have a shape of a hexahedral block generated based on the size information of the virtual block. In this case, the size information of the virtual block may include a width, length, and height of the virtual block. In addition, it may be designed that the center of a bottom surface of the virtual block is located at the origin of the object coordinate system. The relative pose information of the object may include coordinate value information about coordinate values on a two-dimensional camera coordinate system corresponding to vertices of the hexahedral block, respectively. However, this is only an example of the virtual block and the relative pose information of the object, and it is noted that a shape of the virtual block according to some embodiments is not limited to a hexahedron, the relative pose information of the object does not always include information on the coordinate values of the hexahedral block, and the above-described coordinate values do not always correspond to vertices, respectively.

Internal configurations of a user terminal 110 and server 120 for generating three-dimensional model data of an object will now be described in detail with reference to FIG. 2.

As an example of the device for generating the three-dimensional model data of the object according to an embodiment, the internal configurations of the user terminal 110 and the server 120 are described in detail with reference to FIG. 2.

In an embodiment, the user terminal 110 for generating three-dimensional model data of an object may include a camera module 211, an input/output interface 212, a memory 213, a processor 214, and a communication module 215. The memory 213 is a computer-readable recording medium, including a permanent mass storage device such as random access memory (RAM), read only memory (ROM), and a disk drive. In addition, the memory 213 may temporarily or permanently store program codes and settings for controlling the user terminal 110, camera images, and pose data of an object.

The processor 214 may perform basic arithmetic, logic and input/output operations, thereby processing instructions of a computer program. The instructions may be provided to the processor 214 by the memory 213 or the communication module 215. For example, the processor 214 may be configured to execute instructions that are received, according to program codes stored in a recording device such as the memory 213.

The communication module 215 may provide a function for communicating with the server 120 via a network 130. For example, a request generated by the processor 214 of the user terminal 110 according to program codes stored in a recording device such as the memory 213 may be transmitted to the server 120 via the network 130 under the control of the communication module 215. Conversely, the user terminal 110 may receive control signals, instructions, contents, files, etc. provided under the control of a processor 224 of the server 120 through the communication module 215 via the network 130. For example, the control signals or instructions of the server 120 received through the communication module 215 may be transmitted to the processor 214 or the memory 213, and the contents or files may be stored in a storage medium that the user terminal 110 may further include therein.

In addition, the communication module 215 may communicate with the server 120 via the network 130. A communication method is not limited to any method, but the network 130 may be a local area wireless communication network. For example, the network 130 may be Bluetooth, Bluetooth Low Energy (BLE), or a Wi-Fi communication network.

The input/output interface 212 may be a means for an interface with the camera module 211. The camera module 211 may be a camera module including one or more individual cameras. For example, the camera module 211 may be a camera module embedded in the user terminal 110 or may be a module connected to a separately provided camera device.

In addition, the input/output interface 212 may receive a user's input and display output data. The input/output interface 212 according to an embodiment may receive information on a size of a virtual block from the user and may overlay the virtual block on the display and display it.

In addition, in other embodiments, the user terminal 110 may include more components than those of FIG. 2. However, there is no need to clearly show most of components according to the related art. For example, the user terminal 110 may include a battery for power supply to internal components of the user terminal, and a charging device. In addition, the user terminal 110 may be implemented to include at least some of the above-described input/output device or may further include other components such as a transceiver, a global positioning system (GPS) module, various sensors, database, and the like.

Although not shown in FIG. 2, the user terminal 110 may further include one or more sensors based on inertial recognition. According to an embodiment, information related to a motion of a camera may be obtained through the sensor based on inertial recognition. For example, the inertial recognition-based sensor may include at least one of a three-axis gyro sensor and a three-axis acceleration sensor, and pose data of the user terminal 110 may be obtained using information obtained from the inertial recognition-based sensor. The pose data of the user terminal 110 may be, for example, view data or pose data of a camera included in the user terminal 110.

Figure 3:
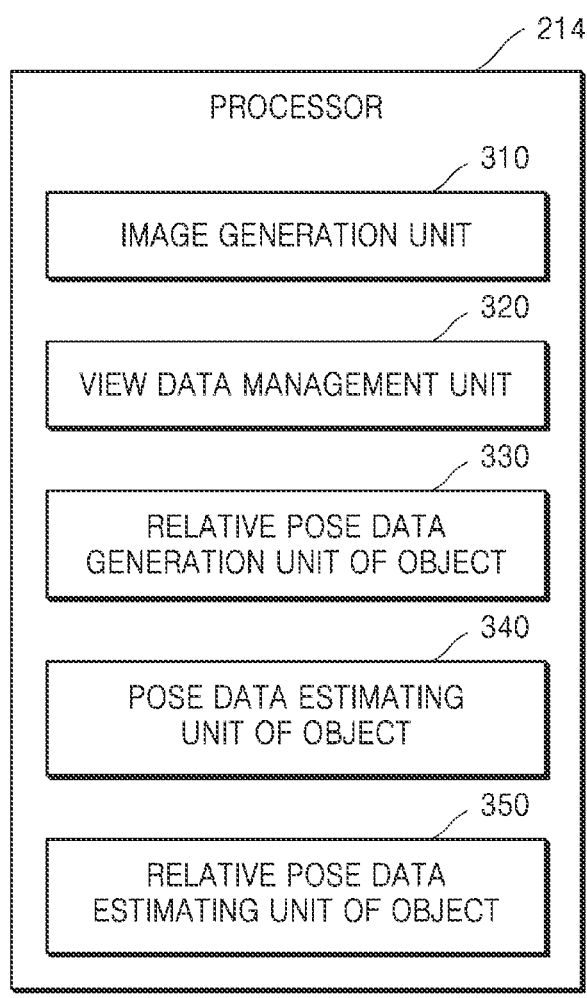
FIG. 3 is a block diagram illustrating an internal configuration of a processor, according to an embodiment.

Hereinafter, an internal configuration of a processor of a user terminal or server for generating three-dimensional model data of an object according to an embodiment will be examined in detail with reference to FIG. 3. Although it is assumed that a processor to be described later below refers to the processor 214 of the user terminal 110 for generating three-dimensional model data of the object shown in FIG. 2, but note, in an embodiment, when three-dimensional model data of the object is generated in the server 120, the processor may be the processor 224 of the server 120 shown in FIG. 2.

The processor 214 of a device for generating three-dimensional model data of an object according to an embodiment may include an image generation unit 310, a view data management unit 320, a relative pose data generation unit 330 of an object, a pose data estimating unit 340 of an object, and a relative pose data estimating unit 350 of an object. According to some embodiments, the components of the processor 214 may be selectively included in the processor 214 or omitted. In addition, according to some embodiments, the components of the processor 214 may be separated or merged to express functions of the processor 214.

Figure 4:
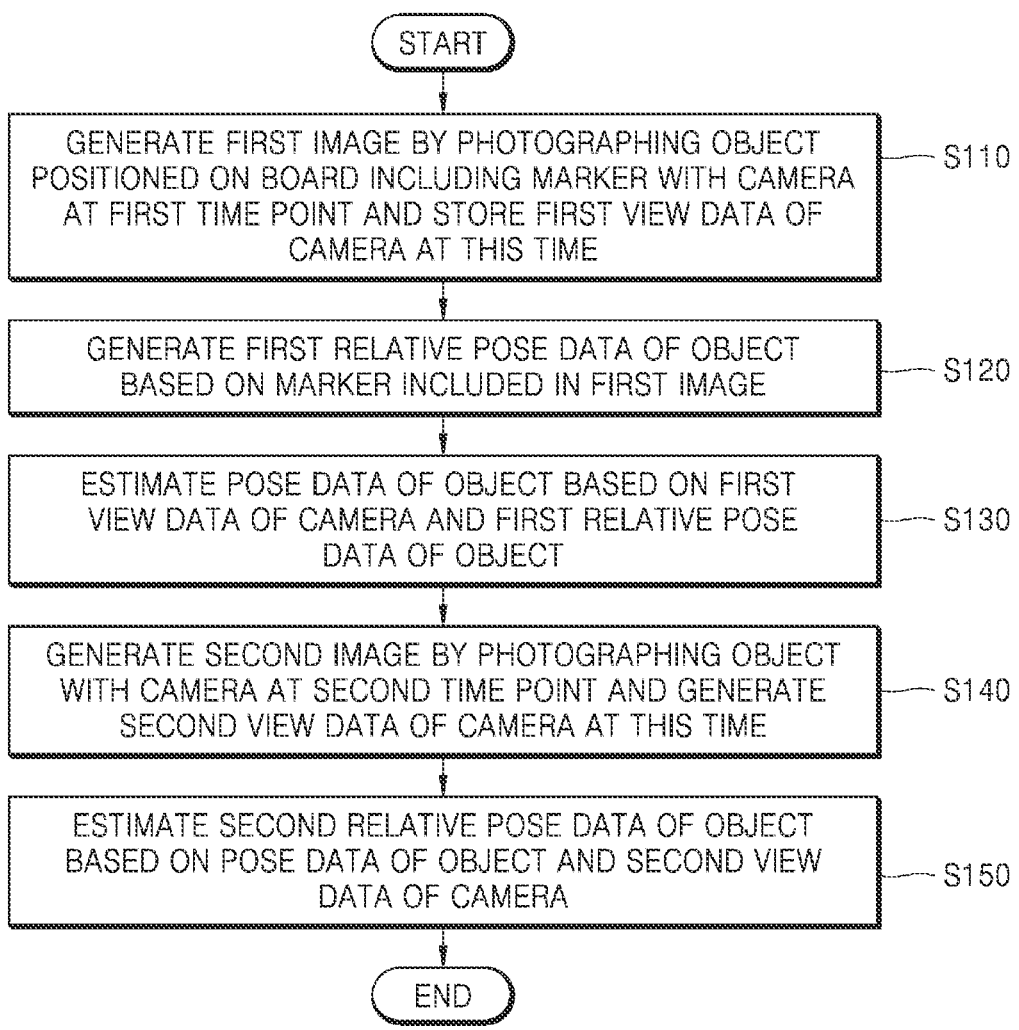
FIG. 4 is a flowchart of a method of generating three-dimensional model data of an object, according to an embodiment.

The processor 214 and the components of the processor 214 may control the user terminal 110 to perform operations S110 to S150 of a method for generating three-dimensional model data of an object shown in FIG. 4. For example, the processor 214 and the components of the processor 214 may be implemented to execute instructions according to codes of an operating system included in the memory 213 and codes of at least one program. Here, the components of the processor 214 may be representations of different functions of the processor 214 performed by the processor 214 according to instructions provided by program codes stored in the user terminal 110. An internal configuration and specific operations of the processor 214 will be described with reference to FIGS. 4 and 5 to 8, respectively.

FIG. 4 is a diagram illustrating in time series a method of generating three-dimensional model data of an object according to an embodiment.

Below, for easy understanding, pose data of an object is denoted as "$M_{obj}^{wc}$". The pose data $M_{obj}^{wc}$ of the object may be a matrix for converting coordinate values on an object coordinate system onto a world coordinate system, or element values thereof. The object coordinate system is a coordinate system defined by the marker 101. The origin and the x, y, and z-axes of the object coordinate system are determined by the marker 101. The object is located at the origin of the object coordinate system and may be located on the object coordinate system in a direction set by the user. In other words, the object may be located in a location and direction set by the user with respect to the markers 101. For example, the user may position the object at the exact center of the markers 101 so that a front surface of the object faces any one of the markers 101 or a direction defined with respect to any one of the markers 101.

View data of a camera is denoted as "$M_v$". First view data is denoted as second view data is denoted as "$M_{v\_2}$", and third view data is denoted as "$M_{v\_3}$". The view data $M_v$ of the camera may be a view matrix showing how the world, that is, a fixed subject, moved and rotated on the camera coordinate system, which is defined by a pose of the camera.

Relative pose data of the object is denoted as "$M_{obj}^{ec}$". The relative pose data $M_{obj}^{ec}$ of the object may be a matrix for converting coordinate values on the object coordinate system onto the camera coordinate system defined by the pose of the camera, or element values thereof. First relative pose data is denoted as "$M_{obj}^{ec\_1}$", second relative pose data is denoted as "$M_{obj}^{ec\_2}$", and third relative pose data is denoted as "$M_{obj}^{ec\_3}$".

Pose data of the camera is denoted as "$M_{ec}^{wc}$". The pose data $M_{ec}^{wc}$ of the camera is to show how the camera has moved and rotated on the world coordinate system and may be a matrix for converting coordinate values on the world coordinate system onto the camera coordinate system, or element values thereof. The pose data of the camera may be denoted as "$M_v^{-1}$". First pose data of the camera is denoted as "$M_{ec\_1}^{wc}$", second pose data of the camera is denoted as "$M_{ec\_2}^{wc}$", and third pose data of the camera is denoted as "$M_{ec\_3}^{wc}$".

The pose data $M_{obj}^{wc}$ of the object, the relative pose data $M_{obj}^{ec}$ of the object, the view data $M_v$ of the camera, and the pose data $M_{ec}^{wc}$ of the camera may each be in a form of a 4×4 pose matrix. The 4×4 pose matrix may include a 3×3 rotation matrix and a 3×1 translation matrix. For example, the 4×4 pose matrix may be defined as [(3×3 rotation matrix), (3×1 translation matrix); (0 0 0), 1].

First relative pose information of the object is denoted as and second relative pose information of the object is denoted as "$P_{1\sim n}^{2dec\_2}$". Relative pose information $P_{1\sim n}^{2dec}$ of the object may be generated based on virtual block coordinates $P_{vb}^{ec}$ on a three-dimensional camera coordinate system generated using the relative pose data $M_{obj}^{ec}$ of the object and virtual block coordinates $P_{vb}^{2dec}$ on a two-dimensional camera coordinate system in which the virtual block coordinates $P_{vb}^{ec}$ on the three-dimensional camera coordinate system is shown on the two-dimensional camera coordinate system. The relative pose information '$P_{1\sim n}^{2dec}$ of the object may include coordinate values on the two-dimensional camera coordinate system corresponding to feature points (1~n) of the virtual block.

Referring to FIG. 4, a first image Image1 may be generated by photographing an object positioned on a board including a marker with a camera at a first time point t1, and first view data $M_{v\_1}$ of the camera at this time may be stored, in operation S110.

The image generation unit 310 may generate the first image Image1 by photographing the object with the camera at the first time point t1. The object is placed on a board including a marker. The object is displayed in the first image Image1, and the marker may or may not be displayed depending on a shooting angle of the camera. In the following description, it is assumed that both the object and the marker are displayed in the first image Image1.

The view data management unit 320 may store the first view data $M_{v\_1}$ of the camera at the first time point t1. The first view data $M_{v\_1}$ may be a view matrix showing how the world moved and rotated in a first camera coordinate system. The first camera coordinate system is a coordinate system determined by a pose of the camera at the first time point t1, the x and y-axes of the first camera coordinate system correspond to the horizontal and vertical axes of the camera, respectively, and the −z-axis of the first camera coordinate system corresponds to a gaze direction of the camera.

In another embodiment, the view data management unit 320 may store the first pose data $M_{ec\_1}^{wc}$ of the camera. The first pose data $M_{ec\_1}^{wc}$ of the camera may be a pose matrix or model matrix showing a pose of the camera on the world coordinate system at the first time point t1. The first pose data $M_{ec\_1}^{wc}$ of the camera may refer to a matrix for converting coordinate values on the first camera coordinate system to the world coordinate system, or element values thereof.

The first view data $M_{v\_1}$ of the camera may have an inverse function relationship with the first pose data $M_{ec\_1}^{wc}$ of the camera. The view data management unit 320 may generate the first view data $M_{v\_1}$ of the camera by calculating an inverse matrix of the first pose data $M_{ec\_1}^{wc}$ of the camera or may generate the first pose data $M_{ec\_1}^{wc}$ of the camera by calculating an inverse matrix of the first view data $M_{v\_1}$ of the camera.

In the present specification, the view data $M_{v\_1}$ and the pose data $M_{ec}^{wc}$ of the camera are understood to have the above meaning, but according to another embodiment, the pose data $M_{ec}^{wc}$ may correspond to a view matrix showing how the world moved and rotated on the first camera coordinate system, and the view data $M_{v\_1}$ may correspond to a pose matrix or model matrix showing the pose of the camera on the world coordinate system at the first time point t1.

Thereafter, first relative pose data $M_{obj}^{ec\_1}$ of the object may be generated based on markers included in the first image Image1, in operation S120.

The relative pose data generation unit 330 of the object may generate the first relative pose data $M_{obj}^{ec\_1}$ of the object based on the markers of the first image Image1.

The first relative pose data $M_{obj}^{ec\_1}$ of the object may be a matrix for converting coordinate values on the object coordinate system onto the first camera coordinate system, or element values thereof. The first camera coordinate system is a coordinate system defined by a pose of the camera at the first time point t1 at which the first image Image1 is generated.

The object coordinate system is a coordinate system defined by the marker 101. The relative pose data generation unit 330 of the object may recognize the markers in the first image Image1, and based on identification numbers, positions, sizes, and alignment directions of the markers, may detect coordinates in the first image Image1 that correspond to the origin of the object coordinate system, and a direction of each axis of the object coordinate system in the first image Image1. The first image Image1 may correspond to a two-dimensional coordinate system seen from the camera at the first time point t1.

The relative pose data generation unit 330 of the object may convert the origin and the direction of each axis of the object coordinate system in the first image to the origin and the direction of each axis of the object coordinate system expressed on the first camera coordinate system, respectively.

The relative pose data generation unit 330 of the object may determine a relationship between the object coordinate system and the first camera coordinate system using the origin and the direction of each axis of the object coordinate system expressed on the first camera coordinate system, and may generate a matrix for converting coordinate values on the object coordinate system onto the first camera coordinate system, that is, the first relative pose data $M_{obj}^{ec\_1}$ of the object, based on the relationship between the relationship between the object coordinate system and the first camera coordinate system.

The relative pose data generation unit 330 of the object may generate the first relative pose information $P_{1-n}^{2dec\_1}$ of the object based on the first relative pose data $M_{obj}^{ec\_1}$ of the object.

The relative pose data generation unit 330 of the object may receive size information of a virtual block corresponding to the object. The relative pose data generation unit 330 of the object may generate virtual block coordinates $P_{vb}^{obj}$ on the object coordinate system based on the size information of the virtual block. For example, when a width of 2a, a height of 2b, and a height of c are input as the size information of the virtual block, the virtual block coordinates $P_{vb}^{obj}$ on the object coordinate system may include (a, b, 0), (a, −b, 0), (−a, −b, 0), (−a, b, 0), (a, b, c), (a, −b, c), (−a, −b, c), (−a, b, c) corresponding to the coordinates of each vertex of the virtual block.

The relative pose data generation unit 330 of the object may generate the virtual block coordinates $P_{vb}^{ec\_1}$ on the first camera coordinate system based on the virtual block coordinates $P_{vb}^{obj}$ on the object coordinate system and the first relative pose data $M_{obj}^{ec\_1}$ of the object. The virtual block coordinates $P_{vb}^{ec\_1}$ on the first camera coordinate system may be calculated by multiplying the first relative pose data $M_{obj}^{ec\_1}$ of the object by the virtual block coordinates $P_{vb}^{obj}$ on the object coordinate system.

The relative pose data generation unit 330 of the object may generate the virtual block coordinates $P_{vb}^{2dec\_1}$ on a first two-dimensional camera coordinate system based on the virtual block coordinates $P_{vb}^{ec\_1}$ on the first camera coordinate system. The first camera coordinate system is a three-dimensional coordinate system defined by a pose of the camera at the first time point t1, and the first two-dimensional camera coordinate system is a two-dimensional coordinate system defined by a pose of the camera at the first time point t1. The relative pose data generation unit 330 of the object may use a matrix that converts coordinates on a three-dimensional coordinate system to coordinates on a two-dimensional coordinate system to convert the virtual block coordinates $P_{vb}^{ec\_1}$ on the first camera coordinate system into virtual block coordinates $P_{vb}^{2dec\_1}$ on the first two-dimensional camera coordinate system.

The relative pose data generation unit 330 of the object may generate the virtual block coordinates $P_{vb}^{2dec\_1}$ on the first two-dimensional camera coordinate system as the first relative pose information $P_{1-n}^{2dec\_1}$.

The first relative pose data $M_{obj}^{ec\_1}$ of the object shows a position and direction relationship between the object and the camera, but the first relative pose information $P_{1-n}^{2dec\_1}$ of the object, that is, the virtual block coordinates $P_{vb}^{2dec\_1}$ on the two-dimensional camera coordinate system, may show not only the position and direction relationship between the object and the camera but also the position of a portion where the object is displayed in the first image. Therefore, it is easy to accurately extract a portion in which the object is displayed in the first image.

The pose data estimating unit 340 may estimate the pose data $M_{obj}^{wc}$ of the object based on the first view data $M_{v\_1}$ of the camera and the first relative pose data $M_{obj}^{ec\_1}$ of the object, in operation S130. In an embodiment, the pose data $M_{obj}^{wc}$ of the object may be a matrix for converting coordinate values on the object coordinate system defined based on a marker to the world coordinate system, or element values thereof.

In an embodiment, the pose data estimating unit 340 of the object may calculate the first pose data $M_{ec\_1}^{wc}$ of the camera showing a pose of the camera at the first time point t1 on the world coordinate system based on the first view data $M_{v\_1}$ of the camera. The pose data estimating unit 340 of the object may calculate the pose data $M_{obj}^{wc}$ of the object by multiplying the first pose data $M_{ec\_1}^{wc}$ of the camera by the first relative pose data $M_{obj}^{ec\_1}$ of the object.

When the camera's shooting angle is too low, the processor 214 may not recognize identification information, size, and direction of a marker, even if the marker is included in the first image. In addition, the processor 214 may not extract information about the object coordinate system from the first image because at least some of the markers are covered by the object according to a position of the camera. In this case, the processor 214 is unable to extract the relative pose data $M_{obj}^{ec}$ of the object.

The processor 214 according to an embodiment may generate the relative pose data $M_{obj}^{ec\_1}$ of the object by using the view data $M_{v\_1}$ of the camera, even when no marker is identified.

In an embodiment, a second image Image2 may be generated by photographing the object with a camera at a second time point, and second view data $M_{v\_2}$ of the camera at this time may be generated, in operation S140.

The image generation unit 310 generates a second image Image2 by photographing the object with a camera at the second time point. It is assumed that only the object is displayed in the second image Image2 or that information on the marker is not identified by the processor 214 even if the marker is displayed in the second image Image2.

The view data management unit 320 may generate the second view data $M_{v\_2}$ of the camera at the second time point and store the generated second view data $M_{v\_2}$. The second view data $M_{v\_2}$ may be a view matrix showing how the world has moved and rotated in a second camera coordinate system. The second camera coordinate system is a coordinate system determined by a pose of the camera at the second time point.

The second relative pose data $M_{obj}^{ec\_2}$ of the object may be estimated based on the pose data $M_{obj}^{wc}$ of the object and the second view data $M_{v\_2}$ of the camera, in operation S150.

The relative pose data estimating unit 350 of the object may estimate the second relative pose data $M_{obj}^{ec\_2}$ of the object based on the pose data $M_{obj}^{wc}$ of the object and the second view data $M_{v\_2}$ of the camera. In an embodiment, the relative pose data estimating unit 350 of the object may calculate the second relative pose data $M_{obj}^{ec\_2}$ of the object by multiplying the second view data $M_{v\_2}$ of the camera by the pose data $M_{obj}^{wc}$ of the object.

The relative pose data estimating unit 350 of the object may generate the second relative pose information $P_{1-n}^{2dec\_2}$ based on the second relative pose data $M_{obj}^{ec\_2}$ of the object. For example, the relative pose data estimating unit 350 of the object may calculate the virtual block coordinates $P_{vb}^{ec\_2}$ on the camera coordinate system at the second time point by multiplying the second relative pose data $M_{obj}^{ec\_2}$ of the object by the virtual block coordinates $P_{vb}^{obj}$ on the object coordinate system. The relative pose data estimating unit 350 of the object may convert the virtual block coordinates $P_{vb}^{ec\_2}$ on the camera coordinate system at the second time point into the virtual block coordinates $P_{vb}^{2dec\_1}$ on the two-dimensional camera coordinate system at the second time point. The relative pose data estimating unit 350 of the object may generate the virtual block coordinates $P_{vb}^{2dec\_1}$ on the two-dimensional camera coordinate system at the second time point as the second relative pose information $P_{1\sim n}^{2dec\_2}$.

Three-dimensional model data of the object generated at various angles is required to accurately render a three-dimensional image of a virtual object. The camera needs to be moved every frame and the object need to be photographed from various angles to generate three-dimensional model data of the object from various angles. As the camera moves, the view data $M_v$ of the camera changes, and marker information may not be identified in the captured image.

According to an embodiment, the relative pose data estimating unit 350 of the object may estimate the relative pose data $M_{obj}^{ec}$ of the object by using the camera's view data $M_v$ changing according to a motion of the camera and the previously obtained pose data $M_{obj}^{wc}$ of the object. Such a method will be described in detail later below with reference to FIG. 6.

In another embodiment, in order to increase the accuracy of the relative pose data $M_{obj}^{ec}$ of the object, when the marker information may be obtained, the relative pose data $M_{obj}^{ec}$ of the object may be directly obtained using the markers instead of the view data $M_v$ of the camera. In other words, according to the present embodiment, the relative pose data estimating unit 350 of the object may estimate the relative pose data $M_{obj}^{ec}$ of the object by using the view data $M_v$ of the camera only when the marker information is unable to be obtained, thus minimizing the amount of computational operation for generating three-dimensional model data of the object.

In another embodiment, when estimating the relative pose data $M_{obj}^{ec}$ of the object by using the view data $M_v$ of the camera, the accuracy of the estimated relative pose data $M_{obj}^{ec}$ of the object may decrease according to a degree of motion of the camera. The accuracy of the relative pose data $M_{obj}^{ec}$ of the object may be calculated based on a degree of matching between the relative pose data $M_{obj}^{ec}$ of the object and a position of the object.

Therefore, when it is expected that the accuracy of the estimated relative pose data $M_{obj}^{ec}$ of the object is low, the relative pose data generation unit 330 of the object may correct the relative pose data $M_{obj}^{ec}$ of the object estimated by the relative pose data estimating unit 350 of the object by using the relative pose data $M_{obj}^{ec}$ of the object obtained using the markers. A more detailed description thereof will be given later below with reference to FIGS. 7 to 8.

Hereinafter, a method of generating three-dimensional model data of an object when an image of the object does not include any marker will be described in detail below with reference to FIG. 5. Hereinafter, for easy understanding, it is assumed that three-dimensional model data of the object is generated by a camera 10. However, according to some embodiments, the method of generating three-dimensional model data of the object may be performed by a computing device or server that received data captured by an external camera device.

Figures 5A, 5B:
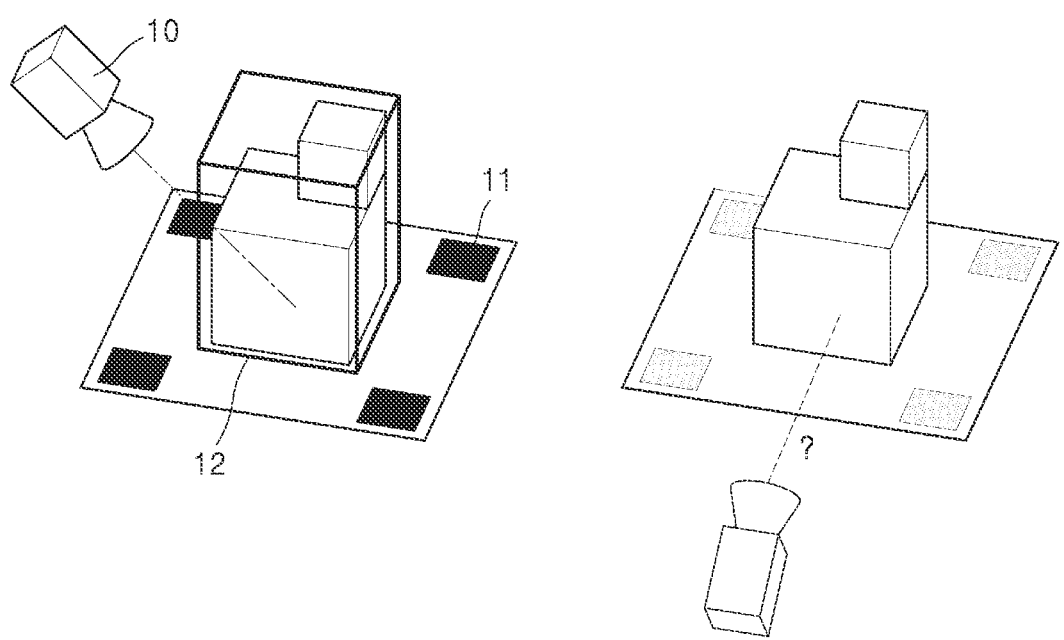
FIG. 5 is a diagram for explaining a case in which marker information is unable to be obtained in a method of generating three-dimensional model data of an object, according to an embodiment.

Referring to section (a) of FIG. 5, when at least one of one or more markers included in an image captured by the camera 10 is recognized, first relative pose data $M_{obj}^{ec\_1}$ of the object may be obtained from a marker 11 that has been recognized. The camera 10 may generate first relative pose information $P_{1\sim n}^{n2dec\_1}$ of the object based on the first relative pose data $M_{obj}^{ec\_1}$ of the object, and store the generated first relative pose information $P_{1\sim n}^{n2dec\_1}$.

The camera 10 may obtain second relative pose data $M_{obj}^{ec\_2}$ of the object from the recognized marker 11 and may generate second relative pose information $P_{1\sim n}^{2dec\_2}$ of the object based on the second relative pose data $M_{obj}^{ec\_2}$ and store the generated second relative pose information $M_{obj}^{ec\_2}$.

However, in the case of generating three-dimensional model data of the object by using only the above-described method where marker information is unable to be obtained as shown in section (b) of FIG. 5, the limitation is that the relative pose data $M_{obj}^{ec}$ of the object is unable to be generated. In this regard, a method of obtaining relative pose data $M_{obj}^{ec}$ of an object even when no marker is able to be obtained will now be described in detail below with reference to FIG. 6.

Hereinafter, a method of generating three-dimensional model data of an object according to an embodiment will be described in detail below with reference to FIG. 6.

Referring to section (a) of FIG. 6, the user may place an object at a preset position on a board including a marker in a preset direction with respect to the marker. For example, the user may position the object at the exact center of the markers in a preset direction with respect to the markers.

Referring to section (b) of FIG. 6, the camera may generate a first image by photographing the object along with the markers with the camera at a first time point, and first view data $M_{v\_1}$ of the camera at this time may be stored. In addition, the camera may generate first relative pose data $M_{obj}^{ec\_1}$ of the object based on the markers included in the first image.

Referring to section (c) of FIG. 6, the camera may receive size information of a virtual block corresponding to the object and may generate virtual block coordinates $P_{vb}^{obj}$ on the object coordinate system based on the size information of the virtual block. The camera may generate virtual block coordinates $P_{vb}^{ec\_1}$ on the first camera coordinate system based on the virtual block coordinates $P_{vb}^{obj}$ on the object coordinate system and the first relative pose data $M_{obj}^{ec\_1}$ of the object. The camera may generate virtual block coordinates $P_{vb}^{2dec\_1}$ on the first two-dimensional camera coordinate system as first relative pose information $P_{1\sim n}^{2dec\_1}$ based on virtual block coordinates $P_{vb}^{ec\_1}$ on a first camera coordinate system.

Similarly, referring to section (d) of FIG. 6, although view data $M_v$ of the camera changes as the camera moves, an image captured by the camera includes the markers as well as the object, and thus, the camera may generate relative pose data $M_{obj}^{ec}$ of the object based on the markers and generate virtual block coordinates on the two-dimensional camera coordinate system based on the relative pose data $M_{obj}^{ec}$ of the object. The camera may generate the virtual block coordinates $P_{vb}^{2dec}$ on the two-dimensional camera coordinate system as relative pose information $P_{1\sim n}^{2dec}$.

Referring to section (e) of FIG. 6, the camera's shooting angle is lowered, and thus, the camera may not photograph the markers. The camera may estimate second relative pose data $M_{obj}^{ec\_2}$ of the object by using the second view data $M_{v\_2}$ of the camera corresponding to the pose of the camera at this time and the previously obtained pose data $M_{obj}^{wc}$ of the object. The camera may generate second relative pose information $P_{1\sim n}^{n2dec\_2}$ based on the second relative pose data $M_{obj}^{ec\_2}$.

The camera may estimate a direction and magnitude of a translational motion and a direction and magnitude of a rotational motion in response to a motion of the camera between a first time point t1 and a second time point t2, and may obtain second view data $M_{v\_2}$ of the camera based on the first view data $M_{v\_1}$ of the camera, the direction and magnitude of the translational motion and the direction and magnitude of the rotational motion.

In an embodiment, the direction and magnitude of the translational motion and the direction and magnitude of the rotational motion may be estimated based on a change between feature points of the first image and feature points in the second image.

In another embodiment, the direction and magnitude of the translational motion and the direction and magnitude of the rotational motion may be estimated based on the change between the feature points of the first image and the feature points of the second image and a sensor value of an inertial sensor in the camera.

That is, according to the method of generating the three-dimensional model data of the object, relative pose information of the object may be generated for every frame. Through this, a large amount of three-dimensional model data of an object used to train a learning model for estimating a pose of the object may be obtained, and in particular, an image of the object captured at an angle where it is difficult to obtain information on the markers may be utilized as three-dimensional model data of the object. Thus, a pose of the target may be estimated at any angle.

Figure 7:
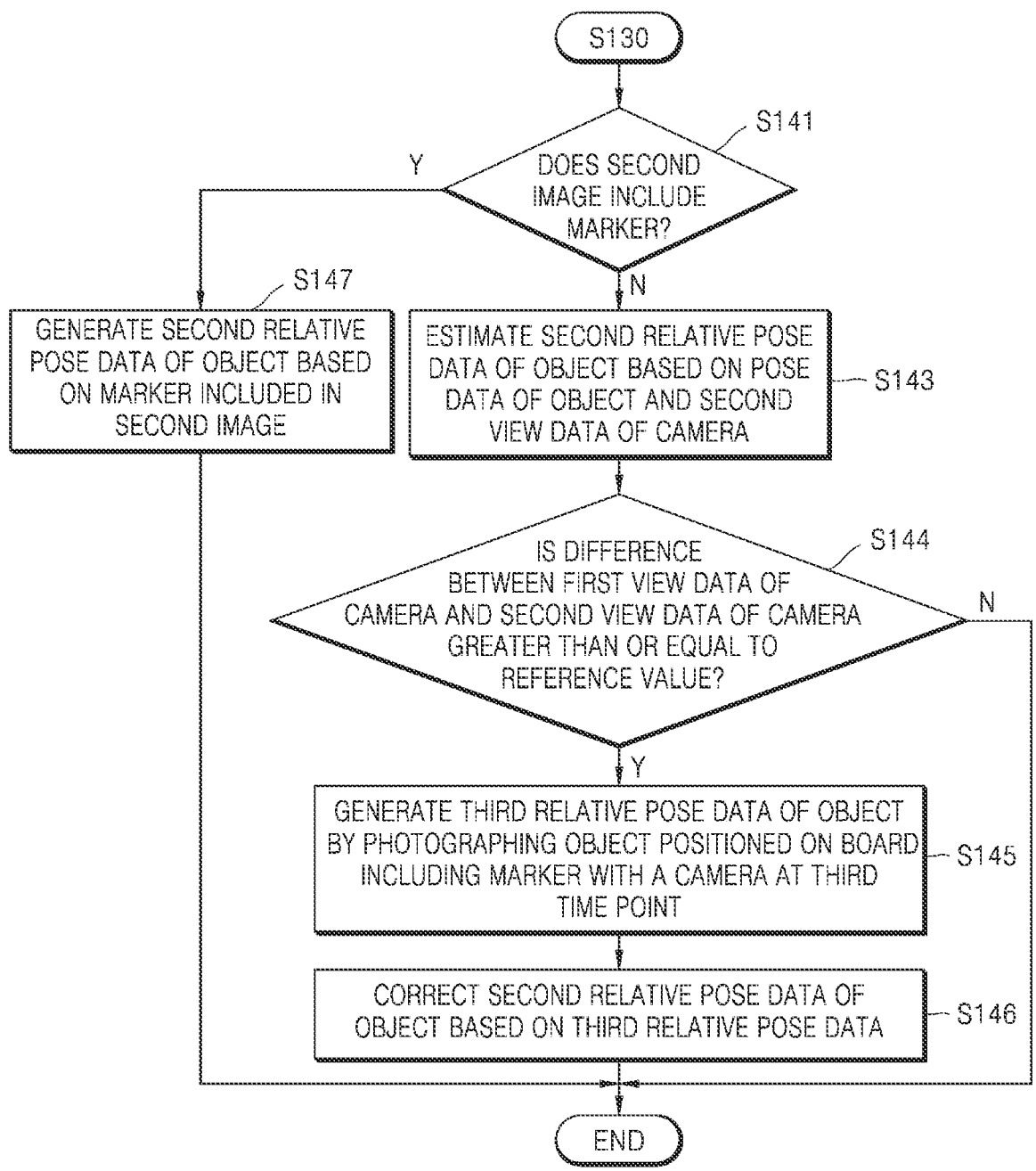
FIG. 7 is a flowchart for explaining in detail some operations of FIG. 4, according to an embodiment.

FIG. 7 is a diagram for explaining some operations of FIG. 4 in detail according to an embodiment.

First, it may be identified whether the second image captured by the camera includes a marker, in operation S141. A time point at which the second image is captured is referred to as a second time point.

When the second image includes a marker, the relative pose data generation unit 330 of the object may generate second relative pose data $M_{obj}^{ec\_2}$ of the object as described above in operation S120, based on the marker, in operation S147.

When a marker is included in the second image or when information on a marker is unable to be identified even when the second image includes the marker, the relative pose data estimating unit 350 of the object may estimate second relative pose data $M_{obj}^{ec\_2}$ of the object based on the pose data $M_{obj}^{wc}$ of the object and the second view data $M_{v\_2}$ of the camera, in operation S143.

Thereafter, the relative pose data estimating unit 350 of the object may identify whether a difference between the first view data $M_{v\_1}$ of the camera and the second view data $M_{v\_2}$ of the camera is greater than or equal to a reference value, in operation S144.

In an embodiment, a position of the camera photographing the object may change every frame to obtain various and large amounts of three-dimensional model data for the object. Thus, when the difference between the first view data $M_{v\_1}$ of the camera and the second view data $M_{v\_2}$ of the camera is greater than or equal to the reference value, the second relative pose data $M_{obj}^{ec\_2}$ described above may be corrected at a third time point when a third image including a marker is captured.

Thus, the relative pose data estimating unit 350 of the object may generate third relative pose data $M_{obj}^{ec\_3}$ of the object at the aforementioned third time point, in operation S145.

When the camera moves more than a specified reference value, the relative pose data estimating unit 350 of the object may correct the second relative pose data $M_{obj}^{ec\_2}$ based on the third relative pose data $M_{obj}^{ec\_3}$ by using a graph optimization technique, in response to obtaining the marker information, in operation S146. As described above, when the moving distance or moving angle of the camera is greater than or equal to a specified value, the accuracy of the estimated relative pose data $M_{obj}^{ec}$ of the object is likely to be low.

In an embodiment, when the difference between the first view data $M_{v\_1}$ and the second view data $M_{v\_2}$ of the camera is less than or equal to the reference value, the relative pose data estimating unit 350 of the object may not correct the relative pose data $M_{obj}^{ec}$ of the object. In an embodiment, a motion of the camera may include a distance change and an angle change. In the present embodiment, when the moving distance and moving angle of the camera are less than the specified value, a separate error value correction may not be performed so as to reduce the computing operation.

Hereinafter, a method of correcting relative pose data $M_{obj}^{ec}$ of an object in an embodiment of the present disclosure will be described in detail with reference to FIG. 8.

In the method of generating the three-dimensional model data of the object according to an embodiment, when marker information is unable to be obtained through a camera, the camera may store relative pose data $M_{obj}^{ec}$ and view data $M_v$ of the object in a separate storage space and may generate relative pose information $P_{1\sim n}^{2dec}$ of the object at a next time point.

Figure 8A:
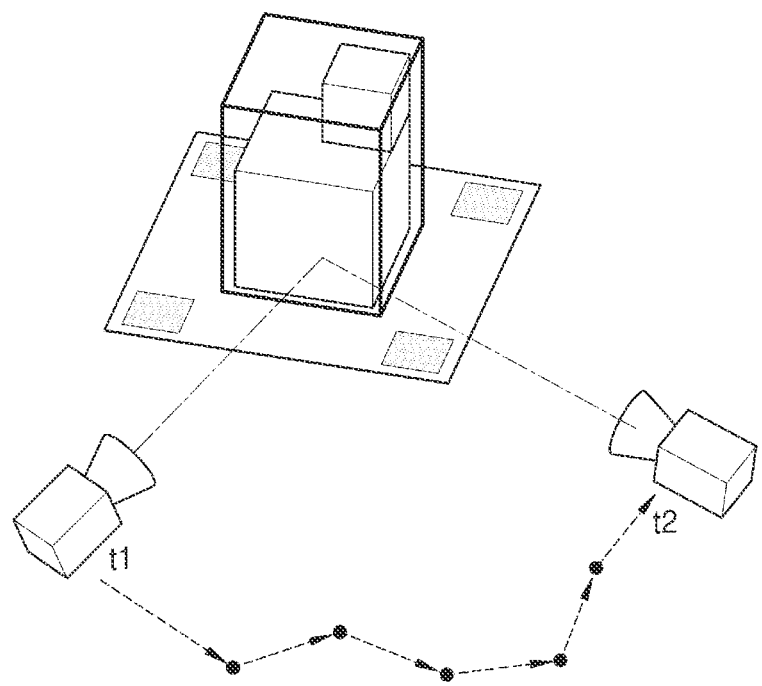
FIG. 8 is a diagram for explaining a method of correcting pose data of a camera, according to an embodiment.
Figure 8B:
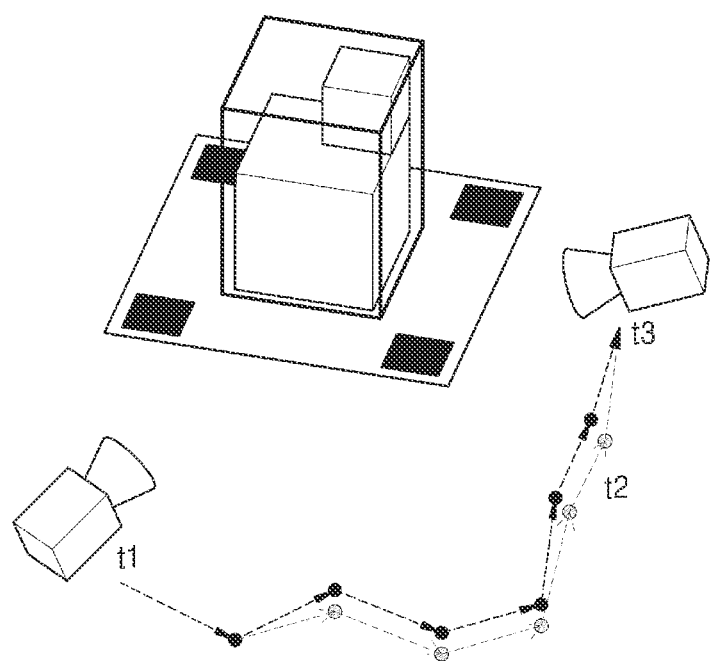

Referring to section (a) of FIG. 8, when a difference between view data $M_v$ of a plurality of cameras generated during time points t1 to t2 when no marker is able to be photographed is greater than or equal to the specified value, the camera may store first and second view data $M_{v\_1}$ and $M_{v\_2}$ of the camera and first and second relative pose data $M_{obj}^{ec\_1}$ and $M_{obj}^{ec\_2}$ of the object obtained during the first and second time points t1 to t2, and may not generate first and second relative pose information $P_{1\sim n}^{2dec\_1}$ and $P_{1\sim n}^{2dec\_2}$ of the object. In this case, the first and second view data $M_{v\_1}$ and $M_{v\_2}$ of the camera and first and second relative pose data $M_{obj}^{ec\_1}$ and $M_{obj}^{ec\_2}$ of the object obtained according to an embodiment may be stored in a separate storage space until a time point t3 when a marker is obtained thereafter.

Then, when a marker is obtained at the time point t3 as shown in section (b) of FIG. 8, third relative pose information $P_{1\sim n}^{2dec\_3}$ of the object may be obtained using third relative pose data ($M_{obj}^{ec\_3}$) of the object at the time point t3. In addition, according to an embodiment, the camera may generate pose data $M_{obj}^{wc}$ of the object by using the third view data $M_{v\_3}$ of the camera and the third relative pose data $M_{obj}^{ec\_3}$ of the object, and may correct the first and second relative pose data $M_{obj}^{ec\_1}$ and $M_{obj}^{ec\_2}$ of the object obtained at the first and second time points t1 to t2 using the pose data $M_{obj}^{wc}$ of the object. Thereafter, the first and second relative poses $P_{1\sim n}^{2dec\_1}$ and $P_{1\sim n}^{2dec\_2}$ of the object, which may be virtual block coordinates on the two-dimensional camera coordinate system at the first and second time points t1 to t2, may be generated using the corrected first and second relative pose data $M_{obj}^{ec\_1}$ and $M_{obj}^{ec\_2}$ of the object.

In the present embodiment, the relative pose data $M_{obj}^{ec}$ of the object may be corrected through a graph optimization technique. In the graph optimization technique, a difference between vertices of a graph is minimized. Thus, when the relative pose data $M_{obj}^{ec}$ of the object is corrected using the graph optimization technique, a more natural object pose estimation and object augmentation may be possible.

In the method of generating the three-dimensional model data of the object according to embodiments of the present disclosure, three-dimensional model data necessary for augmenting a three-dimensional object may be obtained.

Certain implementations described in the present disclosure are examples, and do not limit the scope of the present disclosure in any way. For brevity of the specification, descriptions of other functional aspects of electronic configurations, control systems, software, and systems according to the related art may be omitted. In addition, lines and connection members connecting the components shown in the drawings exemplarily illustrate functional connections and/or physical or circuit connections, and in an actual device, may be represented as various functional, physical, or circuit connections that may be replaced or added. In addition, when there is no specific mention, such as "essential" or "importantly", it may not be a necessary component for the application of the present disclosure.

In the specification of the present disclosure (especially in the claims), the use of the term "above" and a reference term similar thereto may correspond to both the singular and the plural. In addition, when a range is described in the present disclosure, embodiments to which individual values belonging to the range are applied is included (unless otherwise stated), and it is the same as describing each individual value constituting the range in the detailed description. Finally, when there is no explicit order or contradictory description of the operations constituting the method according to the present disclosure, the operations may be performed in an appropriate order. The present disclosure is not necessarily limited by the described order of the operations. The use of all examples or exemplary terms (for example, "etc.") in the present disclosure is merely for describing the present disclosure in detail, and the scope of the present disclosure is not limited by the examples or exemplary terms unless limited by the claims. In addition, those of skill in the art will recognize that the present disclosure may be configured according to a design condition and factor within the scope of claims to which various modifications, combinations, and changes are added, and the equivalents thereto.

The embodiment according to the present disclosure described above may be implemented in the form of a computer program that may be executed through various components on a computer, and such a computer program may be recorded in a computer-readable medium. In this case, the medium may continue to store a program executable by a computer or may store it for execution or download. In addition, the medium may be various recording means or storage means in a single form or in a form in which several pieces of hardware are combined. The medium is not limited to a medium directly connected to a computer system, but may be distributed on a network. Examples of the media include magnetic media such as hard disks, floppy disks, and magnetic tapes, optical recording media such as CD-ROMs and DVDs, magneto-optical media such as floptical disks, and ROM, RAM, flash memory, and the like, and may be configured to store program instructions. In addition, other examples of the medium include an app store for distributing applications, a website for supplying or distributing various software, and a recording medium or storage medium managed by a server, etc.

Although the present disclosure is described above by specific matters such as specific components, and limited embodiments and drawings, the descriptions are provided only to help a more general understanding of the present disclosure. The present disclosure is not limited to the above embodiments, and anyone with ordinary skill in the art to which the present disclosure pertains may make various modifications and changes from these descriptions.

Therefore, the spirit of the present disclosure should not be determined by the above-described embodiments in a limited sense, and not only the following claims but also all ranges equivalent to or equivalently changed from the claims belong to the scope of the spirit of the present disclosure.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be modified in various ways. Such modifications are not to be regarded as a departure from the disclosure, and all such modifications are intended to be included within the scope of the disclosure.

What is claimed is:

1. A method, performed by a computing device, of generating three-dimensional model data of an object, the method comprising:
    generating a first image by photographing an object positioned on a board including a marker with a camera at a first time point, and storing first view data of the camera at this time, the first view data of the camera being a matrix for converting a coordinate value on a world coordinate system onto a first camera coordinate system defined by a pose of the camera at the first time point;
    generating first relative pose data of the object, based on the marker included in the first image, the first relative pose data of the object being a matrix for converting a coordinate value on an object coordinate system defined by the marker onto the first camera coordinate system;
    estimating pose data of the object, based on the first view data of the camera and first relative pose data of the object, the pose data of the object being a matrix for converting a coordinate value on the object coordinate system onto the world coordinate system;
    generating a second image by photographing the object with the camera at a second time point in which the marker is not in view of the camera and thus the marker is not included in the second image as photographed, and generating second view data of the camera at this time, wherein the position of the camera at the second time point is different from the position of the camera at the first time point;
    estimating second relative pose data of the object, based on the pose data of the object and the second view data of the camera; and
    generating three-dimension model data of the object based on the first image, the first relative pose data, the second image, and the second relative pose data.

2. The method of claim 1, further comprising:
    generating first relative pose information based on the first relative pose data of the object, and storing the first image and the first relative pose information as training data or transmitting the first image and the first relative pose information to a server communicating with the computing device; and
    generating second relative pose information based on the second relative pose data of the object, and storing the second image and the second relative pose information as training data or transmitting the second image and the second relative pose information to the server communicating with the computing device.

3. The method of claim 2, further comprising receiving size information of a virtual block corresponding to the object, wherein the generating of the first relative pose information comprises:
- generating a virtual block coordinate on the object coordinate system, based on the size information of the virtual block;
- generating a virtual block coordinate on the first camera coordinate system, based on the virtual block coordinate on the object coordinate system and the first relative pose data of the object; and
- generating, as the first relative pose information, a virtual block coordinate on a two-dimensional camera coordinate system at the first time point, based on the virtual block coordinate on the first camera coordinate system.

4. The method of claim 1, wherein the object is arranged in a preset direction at a preset position with respect to the marker.

5. The method of claim 1, wherein the generating of the second view data of the camera comprises:
- estimating a direction and magnitude of a translational motion and a direction and magnitude of a rotational motion in response to a motion of the camera between the first time point and the second time point; and
- generating the second view data of the camera based on the first view data of the camera, the direction and magnitude of the translational motion, and the direction and magnitude of the rotational motion.

6. The method of claim 5, wherein the direction and magnitude of the translational motion and the direction and magnitude of the rotational motion are estimated based on a change between feature points of the first image and feature points of the second image.

7. The method of claim 5, wherein the direction and magnitude of the translational motion and the direction and magnitude of the rotational motion are estimated based on a change between feature points of the first image and feature points in the second image and a sensor value of an inertial sensor in the camera.

8. The method of claim 1, wherein:
the second view data of the camera is a matrix for converting a coordinate value on the world coordinate system onto a second camera coordinate system defined by a pose of the camera at the second time point.

9. The method of claim 8, wherein:
the second relative pose data of the object is a matrix for converting a coordinate value on the object coordinate system onto the second camera coordinate system.

10. The method of claim 9, wherein the estimating of the pose data of the object comprises:
- calculating first pose data representing a pose of the camera at the first time point on the world coordinate system, based on the first view data of the camera; and
- calculating the pose data of the object by multiplying the first pose data by the first relative pose data of the object.

11. The method of claim 9, wherein the second relative pose data of the object is calculated by multiplying the second view data of the camera by the pose data of the object.

12. The method of claim 1, wherein the first view data of the camera, the first relative pose data of the object, and the pose data of the object are each in a form of a 4×4 pose matrix including a 3×3 rotation matrix and a 3×1 translation matrix.

* * * * *